United States Patent Office 3,284,531
Patented Nov. 8, 1966

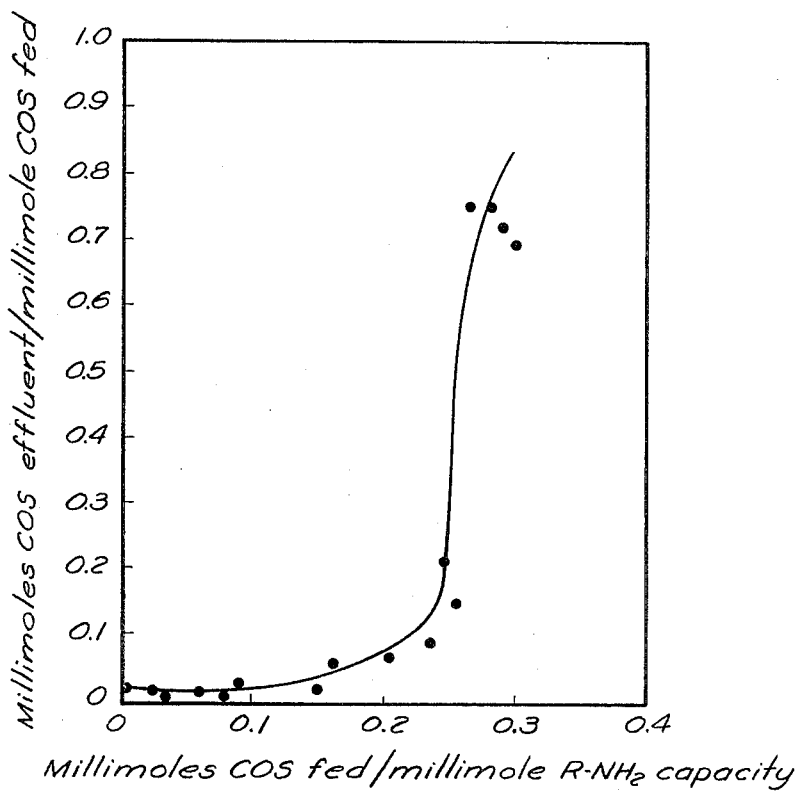

3,284,531
REMOVING CARBONYL SULFIDE WITH AN ANHYDROUS, BASIC, ANION RESIN
Kernal Glenn Shaw and Stanley A. Murdock, both of Concord, Calif., assignors to The Dow Chemical Company, Midland, Mich., a corporation of Delaware
Filed July 6, 1965, Ser. No. 469,511
3 Claims. (Cl. 260—677)

This is a continuation-in-part of application Serial No. 198,790, filed May 31, 1962, now abandoned.

The present invention relates to an improved method for removing carbonyl sulfide from hydrocarbons. More specifically, this invention concerns a method for sorption-removal of COS contaminant from fluid hydrocarbons by contacting said hydrocarbons with an anhydrous, weakly basic, anion exchange resin.

The presence of COS, even at very low concentrations, oftentimes renders olefins valueless for many purposes. For example, high purity olefins (in increasingly large volumes) are required for the satisfactory production of many polymeric products, especially those useful as plastics, including polymers of ethylene, propylene, and the like. Otherwise, suitable polymerization of the olefin monomer may be hampered or made impossible due to the tendency of the sulfur contaminant to poison certain catalysts, hinder reaction, etc. As a result, there has been a real need to improve techniques for purifying hydrocarbons, especially those used for polymer production.

The problems in purifying propylene and the like olefins from COS are singularly complicated by the nearly identical boiling points of propylene and COS which makes COS removal by fractionation unsuitable. As a result, the levels of COS impurity in propylene stocks are oftentimes intolerably high. In addition, the standard procedures for removal of acidic sulfur compounds, such as $H_2S$ and mercaptans, by treatment with caustic solutions are unsatisfactory for removal of COS since this compound is quite stable with little tendency to hydrolyze to carbon dioxide and $H_2S$ even in the presence of strongly alkaline solutions and at elevated temperatures.

Still other disadvantages are encountered in the heretofore known procedures for the removal of COS from hydrocarbons, especially those to be used for olefin polymerization. Thus, some of the established methods introduce water or other contaminants into the hydrocarbon stream, all of which must be removed by additional processing in order to place the hydrocarbon in suitable condition for use. Any such additional processing, as well as any requirement to employ elevated temperatures (as is involved in some prior art techniques) adds materially and undesirably to the cost of the operation.

The primary object of the present invention is to provide an improved and entirely satisfactory method for the removal of COS contaminant from hydrocarbons.

A related object is to remove COS from hydrocarbons by a method which does not require introduction of water and other contaminants into the hydrocarbon stream.

Another object is to provide such a method which is operative at normal ambient temperatures.

A further object is to provide a purification procedure that is especially effective on hydrocarbons in liquid form including such normally gaseous hydrocarbons as ethylene, propylene and the like monomeric olefins.

A still further object of the invention is to provide a hydrocarbon purification method which is economically advantageous and highly efficacious, particularly in respect of treatments on normally gaseous olefins for polymerization, such as ethylene, propylene and the like.

The mentioned objectives, and many cognate benefits and advantages, may be realized in accordance with practice of the present invention which, essentially, involves use of an anhydrous, weakly basic, anion exchange resin for removal of COS from hydrocarbons, especially those being treated while in a liquid condition.

In the method of the present invention a fluid hydrocarbon is passed through a bed of an anhydrous, weakly basic, anion exchange resin to effect removal of COS contaminant by the process of sorption of COS by said resin. In a preferred embodiment of the invention this purification is achieved at normal ambient temperatures and at pressures sufficient to maintain the hydrocarbon in a liquid state. No contaminants are introduced during this purification (the resin is insoluble in the hydrocarbon fluids and the presence of water is not required for the removal of COS) and the use of an anhydrous influent obviates further processing to remove water. This highly advantageous feature of the present invention, i.e. removal of COS in the absence of water, is not a limitation of the method since the resins employed have a high capacity for water and can be used with hydrocarbon feeds containing small amounts of moisture.

An anhydrous, weakly basic, anion exchange resin of the polyamine type containing a mixture of primary, secondary and tertiary amine groups, such as disclosed in U.S. Patent 2,591,574, is advantageously employed in the method of this invention. Various resins of this type are commercially available. For example a particularly suitable resin is manufactured and sold by The Dow Chemical Company, Midland, Michgan, under the designation "Dowex 3" resin. Other weakly basic, polyamine, anion exchange resins are also advantageously used in the method of the present invention. These include the epichlorohydrin-ammonia condensation products and equivalent weak base, polyamine, anion exchange resins.

The major impurity removed in the process of this invention is COS. Adjustment of the rate of flow and length of time of resin use enable a reduction of the COS content to below 1 p.p.m.

Further features and characteristics of the invention appear more fully in the following specification and illustrations thereof, all of which are set forth in order to better illustrate and delineate (and not to unnecessarily limit) the present contribution to the art.

Illustration "A"

A weakly basic anion exchange resin of the polyamine type ("Dowex 3" resin, as obtained from The Dow Chemical Company of Midland, Michigan) was ground and screened to an average particle size of between minus 80 mesh and plus 150 mesh in the U.S. Standard Sieve Series. This ground resin was then packed in a steel column which was about 48 inches long and about 0.49 inch in diameter. The packed resin was dried in the column by passing dry nitrogen gas through the column for about 16 hours while the entire packed column was maintained at about 100° C. The weight of the dried resin was 85.6 g. The dry nitrogen employed contained only about 6–9 parts per million (p.p.m.) by weight of water. The resin was in the free base form.

Propylene containing, as a contaminating impurity about 0.0045 mole percent COS, was passed in a liquid stream flowing downwardly through this resin column at a rate of about 7.6 cc./min. (equivalent to a space velocity of about 3.1 where space velocity equals volume of liquid hydrocarbon passing through unit volume of resin in one hour) at an ambient temperature maintained in the 25°–35° C. range, and under a pressure of about 150–200 p.s.i.g.

The results are graphically demonstrated in the drawing. The resin removed over 90 percent of the COS until 0.225 millimole COS/millimole of reactive amine groups had been fed into the column. The graph indicates maximum removal efficiencies of about 98.5 percent equivalent to a reduction of COS content from 45 p.p.m. to less than 1 p.p.m.. The 86.5 grams of resin removed 214 grams of COS from 28,000 grams of liquid propylene.

Similar removal of COS is achieved when other fluid hydrocarbon streams containing COS are substituted for propylene in the method of this illustration.

*Illustration "B"*

In order to determine the saturation point of the Dowex 3 resin, the procedure of Illustration "A" was followed with the exception that 2030 grams of liquid propylene containing 1.22 weight percent COS (equivalent to 12.8 COS groups per reactive amine group) was passed through 18.05 grams of resin to completely saturate the available amine groups.

When analyzed, the saturated resin contained 0.43 millimole of sulfur/millimole of reactive amine groups. About 4.23 grams of the original 24.7 grams of COS were removed by 18.05 grams of dry Dowex 3 resin.

Space velocity of liquid propylene and particle size of the resin are two important variables. When the space velocity of liquid propylene was increased from about 1.1 to about 6, the percentage removal of COS dropped from about 87 to about 27 percent. The importance of particle size was demonstrated by the results obtained when using minus 20 mesh-plus 50 mesh and when using minus 80 mesh-plus 150 mesh resin to remove COS from a liquid propylene stream with a space velocity of about 5.2. Use of the smaller particle size resin increased COS removal from 49 to 97.5 percent. Since the rate controlling step appears to be the diffusion of COS into the resin sites, any improvement in diffusion rate, such as by decreasing diffusion path distance, increases resin efficiency in COS sorption.

The resin may be readily regenerated by passage of a nitrogen-steam stream through the resin column at a temperature of about 100° C. followed by use of a stream of dry nitrogen or sulfur-free natural gas to dry the resin. It is necessary that air be excluded from the resin during regeneration to avoid resin charring.

We claim:
1. A process for the removal of carbonyl sulfide from fluid hydrocarbons containing carbonyl sulfide which comprises contacting said fluid, at normal atmospheric temperatures, with an anhydrous, weakly basic, anion exchange resin.

2. A process for the removal of carbonyl sulfide from anhydrous liquid propylene containing carbonyl sulfide which comprises contacting said anhydrous liquid propylene, at normal atmospheric temperatures, with an anhydrous, propylene-insoluble, weakly basic, anion exchange resin containing a multiplicity of amine groups.

3. The process of claim 2 wherein the liquid propylene is passed through said resin at a space velocity of from about 1 to 6, said resin having an average particle size of between minus 80 mesh and plus 150 mesh.

References Cited by the Examiner
UNITED STATES PATENTS

| | | | |
|---|---|---|---|
| 2,713,077 | 7/1955 | Rieve | 208—240 |
| 2,718,489 | 9/1955 | Coonradt et al. | 208—240 |
| 2,730,486 | 1/1956 | Coonradt et al. | 208—240 |
| 2,831,799 | 4/1958 | Coonradt et al. | 208—240 |
| 3,108,948 | 10/1963 | Ring | 208—240 |

DELBERT E. GANTZ, *Primary Examiner.*

S. P. JONES, *Assistant Examiner.*